Aug. 18, 1964       R. E. OLSON       3,144,734
TIRE BUFFING AND TRUING MACHINE
Filed June 13, 1963       3 Sheets-Sheet 1

INVENTOR.
RUDOLPH E. OLSON
BY
ATTORNEYS

INVENTOR.
RUDOLPH E. OLSON
BY
Merchant, Merchant & Gould
ATTORNEYS

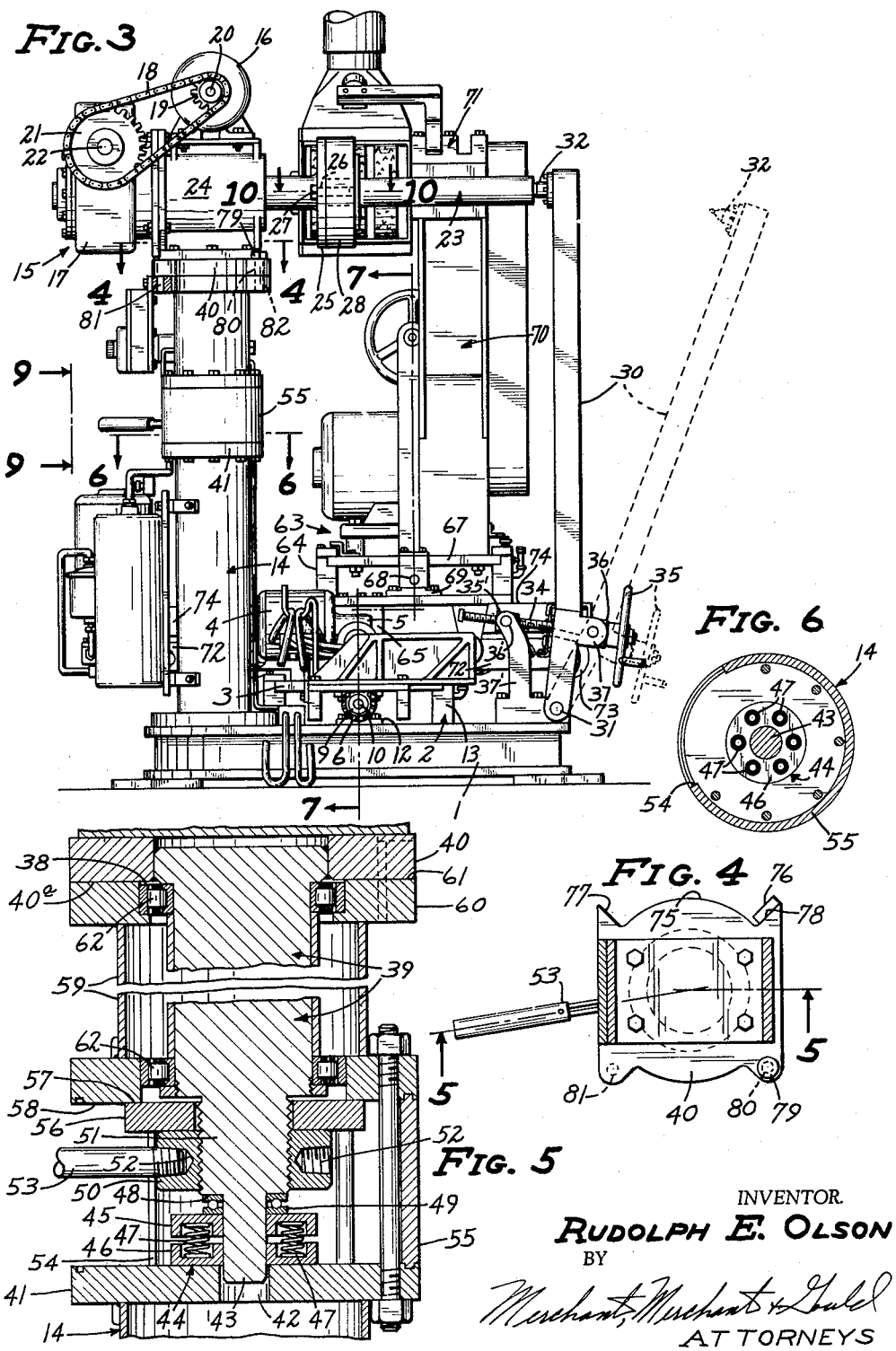

United States Patent Office 3,144,734
Patented Aug. 18, 1964

3,144,734
TIRE BUFFING AND TRUING MACHINE
Rudolph E. Olson, Minneapolis, Minn., assignor to Paul E. Hawkinson Company, Minneapolis, Minn., a corporation of Minnesota
Filed June 13, 1963, Ser. No. 287,567
4 Claims. (Cl. 51—33)

My invention relates generally to tire buffing and truing machines and more particularly to precision or lathe-type machines of this character wherein the pneumatic tires are mounted on rims and inflated during the buffing and truing operations.

More specifically, my invention relates to improvements in or modifications of machines generally disclosed in Patent No. 2,787,089 whereby machines of this character are made more adaptable for use in the buffing of extremely large tires such as used by earth moving vehicles, large aircraft, and the like.

In devices of the class above described, it is extremely difficult and clumsy to raise large sized heavy pneumatic tire casing for mounting on the arbor for subsequent rotation during the buffing and truing operations. The primary object of my invention is to provide novel means whereby the free end of the arbor may be swung laterally out, away from its operative position during the entire mounting and dismounting operations so as to be free from the base and other parts associated therewith during said mounting and dismounting operations.

A further object of my invention is the provision of novel means for supporting the tire mounting arbor when in its operative position so as to substantially eliminate vibration and chatter without unduly adding to the weight of the machine.

A further object of my invention is the provision of novel means of the type above described which incorporate but a minimum of working parts and are not unduly expensive to produce.

A still further object of my invention is the provision of a novel device of the class above described which is rugged and durable in construction and which is facile and relatively foolproof in its operation.

The above and still further objects of my invention will become apparent from the following detailed specification, appended claims and attached drawings.

Referring to the drawings, wherein like characters indicate like parts throughout the several views:

FIG. 3 is a view in end elevation;

FIG. 4 is a view in horizontal section as seen from the line 4—4 of FIG. 3;

FIG. 5 is a view in vertical section as seen from the line 5—5 of FIG. 4;

FIG. 6 is a view in horizontal section as seen from the line 6—6 of FIG. 3;

FIG. 8 is an enlarged fragmentary view as seen from the line 8—8 of FIG. 2, some parts being broken away;

FIG. 9 is an enlarged fragmentary view as seen from the line 9—9 of FIG. 3;

FIG. 10 is a fragmentary sectional view as seen from the line 10—10 of FIG. 3;

FIG. 11 is a fragmentary sectional view taken on the line 11—11 of FIG. 1; and

FIG. 12 is a fragmentary sectional view taken on the line 12—12 of FIG. 7.

Figure 1:
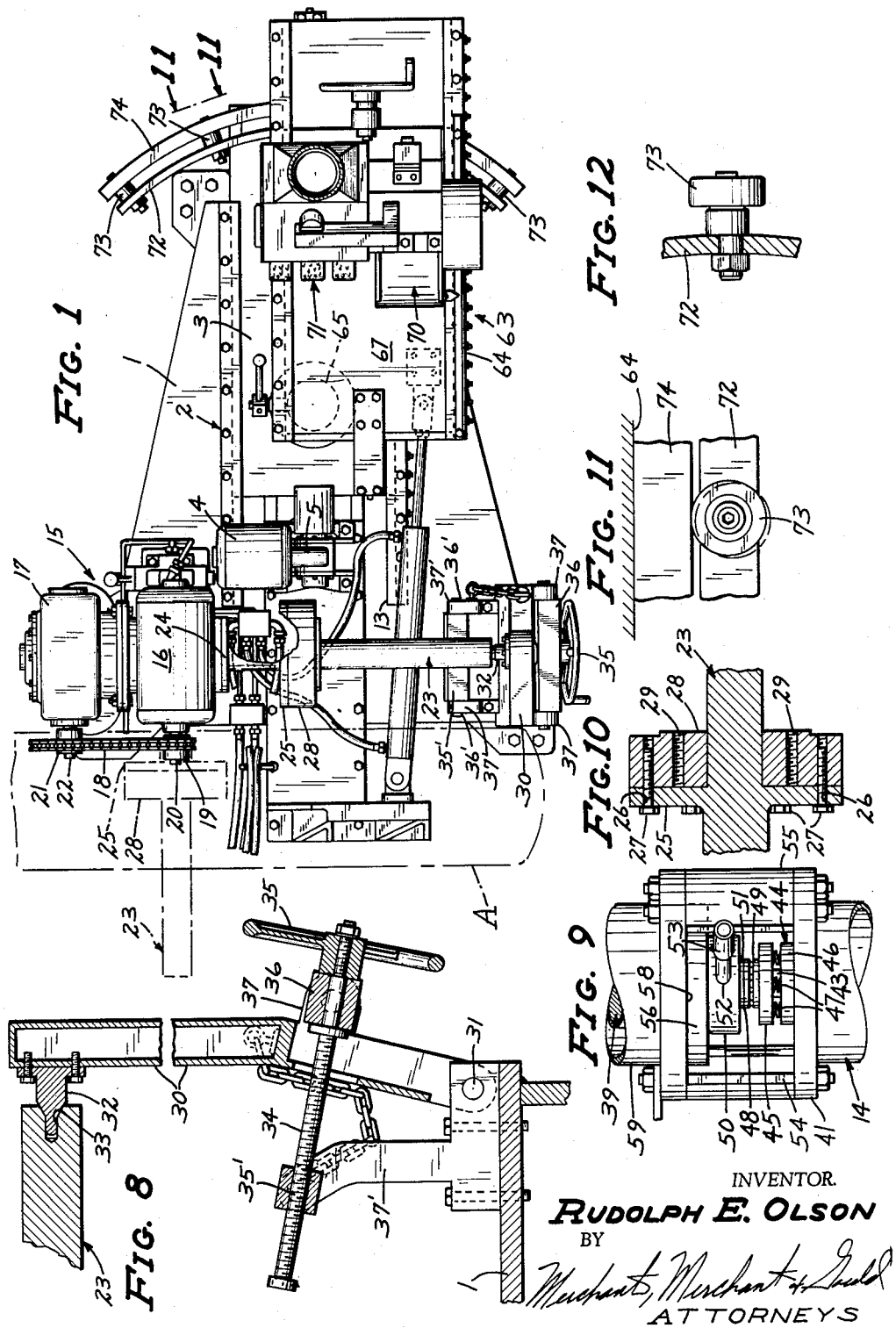
FIG. 1 is a view in top plan of my novel buffing and truing machine.

Referring with greater particularity to the drawings, the numeral 1 indicates a horizontally disposed base which is formed to define a horizontally disposed guideway 2. Mounted and guided for sliding movements in the guideway 2 is a slide member 3. Limited sliding movements in opposite directions are imparted to the slide member 3 through the medium of a motor 4 having a gear reduction unit 5 associated therewith. A flexible link chain 6 is entrained over a sprocket 7 on a power shaft 8 associated with the gear reduction unit 5 and over a sprocket 9 on the inner end 10 of a longitudinally extended screw 11. The intermediate portion of the screw 11 is screw threaded through a nut 12 carried by the base 1. Control of motor 4 is by any suitable conventional means, not shown.

Rigidly secured to and projecting upwardly from the base 1 in longitudinally spaced laterally offset relation to the inner end 13 of the guideway 2 is a rigid column 14 on the extreme upper end of which is mounted a tire-mounting power head, identified in its entirety by the numeral 15.

Power head 15 includes an electric motor 16, having a gear-reduction unit 17 connected thereto by means of a link chain 18, entrained over a sprocket 19, fast on the shaft 20 of the motor 16 and over a sprocket 21, fast on the input shaft 22 of the gear reduction unit 17. A horizontally disposed shaft or arbor 23 has its inner end operatively coupled to the gear-reduction unit 17, by means not specifically shown, but including an axially elongated, tubular bearing 24. The shaft 23, when in its operative, full-line position of FIGURE 3, is normal to the longitudinal axis of the guideway 2.

Figure 2:
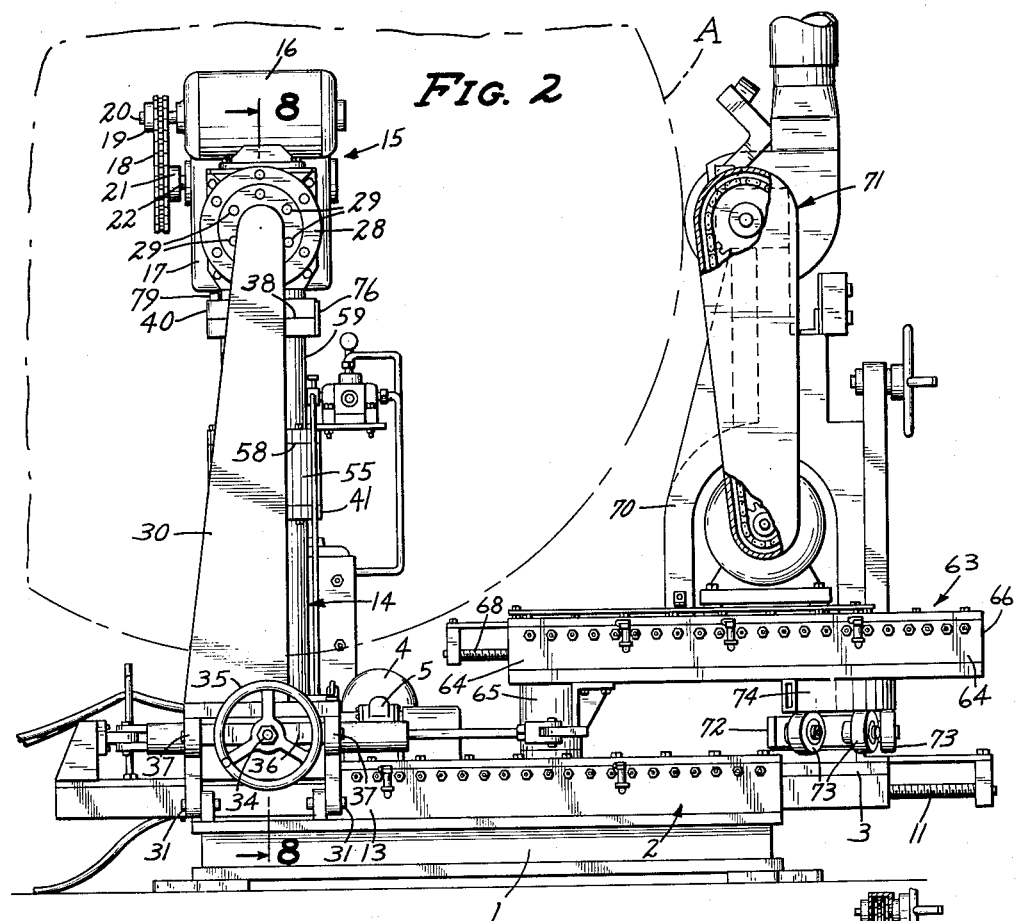
FIG. 2 is a view in side elevation.
Figure 7:
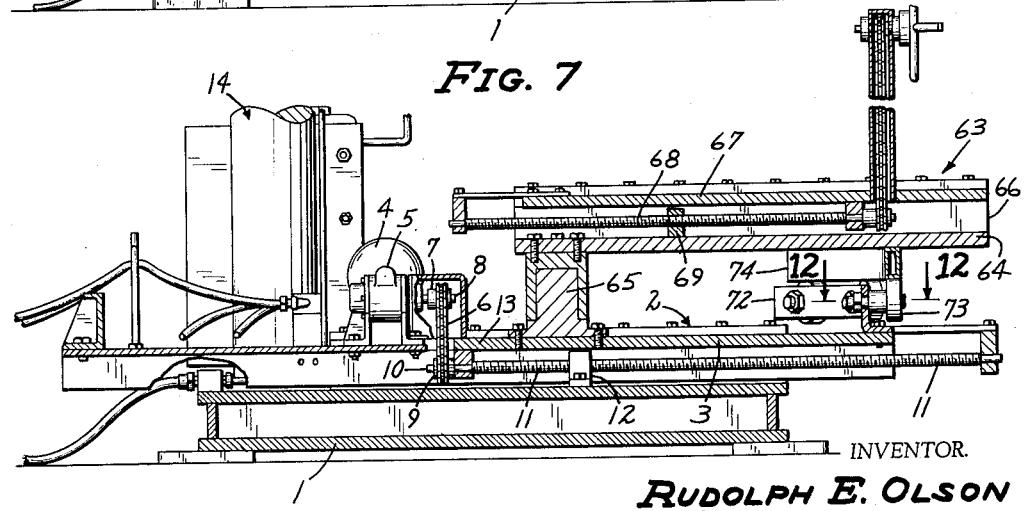
FIG. 7 is a fragmentary sectional view as seen from the line 7—7 of FIG. 3.

Secured to the intermediate portion of the rotary shaft 23 is a diametrically enlarged, tire rim-mounting flange 23 having circumferentially spaced openings 26 for the reception of screw-threaded anchoring bolts 27 for detachably anchoring a conventional pneumatic tire A shown by broken lines in FIGURES 1 and 2. Preferably, the mounting flange 25 is provided with an annular, detachable spacer 28 which likewise is provided with circumferentially spaced, anchoring-bolt receiving openings 29. This particular arrangement makes it possible to mount rim-equipped tires of substantially all larger sizes, ranging from conventional truck tires to the very largest tires, such as used on earth moving equipment. In the event of the former, the spacer 28 is used; whereas, with respect to the latter, wherein the central mounting flange of the rim is laterally offset. With respect to the transverse center of the rim, the spacer 28 is removed.

Supporting the extended outer end of the rotary shaft 23, so as to materially reduce vibration and chattering during the buffing operation, is a leg 30. Leg 30 is pivotally secured to base 1 at its lower end, as indicated at 31, for limited swinging movements on a horizontal axis from the full-line, operative position of FIG. 3, to the dotted line showing thereof. As shown, the leg 30 at its upper end is formed to provide a male bearing element 32 in the nature of a dead center, adapted to be received within an axially, outwardly opening female-bearing element 33 in the extended end of the shaft 23. For the purpose of imparting swinging movements to the leg 30, for reasons immediately hereinafter to be explained, I provide an elongated adjustment screw 34, which is provided at its outer end with a crank wheel 35. As shown, the outer end portion of the screw 34 is mounted for rotation in a bearing block 36, pivotally mounted on a horizontal axis between bracket members 37 fast on the lower end of the leg 30. Having threaded engagement with the screw 34 is an elongated nut 35', the opposite ends of which are pivotally received, as at 36', to the upper ends of bracket members 37' carried by the base 1.

For the purpose of imparting swinging movements to the power head 15 and parts associated therewith, including shaft 23, the upper end portion of the column 14 is formed to define an upwardly opening socket 38, which snugly receives and journals for rotation on a vertical axis, a depending neck 39 fast on mounting plate 40 which, in turn, is rigidly secured to the power head 15.

Preferably, and as shown, the intermediate portion of column 14 is formed to define an annular plate 41, the central opening 42 of which slidably receives the reduced end portion 43 of the neck 39. Concentrically supported on the plate 41 for slidable reception of the reduced end 43 is a circumferentially split collar 44. The upper and lower halves 45 and 46, respectively of which are normally biased apart by a plurality of coiled compression springs 47. Interposed between the upper section 45 of the collar 44 and a shoulder 48 formed in the neck 39 at the upper limits of the reduced portion 43 thereof is a vertical thrust bearing 49. A nut 50 is shown as having screw-threaded engagement with a somewhat enlarged neck portion 51. Nut 50 is provided with circumferentially spaced, radially outwardly opening threaded recesses 52 for the selective reception of a radially projecting handle 53, which projects through a segmental opening 54 in the tubular wall 55. Immediately overlying the nut 50 is a diametrically enlarged washer 56, the upper surface 57 of which has frictional engagement with a shoulder 58 defined by the lower end of a tubular spacer sleeve 59. Sleeve 59 effectively forms the upper end portion of the column 14. At its upper end the spacer sleeve 59 is formed to define a diametrically enlarged annular flange 60, the upper surface 61 of which frictionally engages the lower surface 40a of the mounting plate 40. Vertically spaced lateral thrust bearings 62 are interposed between the neck 39 and the sleeve 59. Bearings 62 are so constructed as to permit limited vertical movement of the neck 39 with respect to the column 14 when the nut 50 is rotated through the medium of the handle 53, so as to lower same, thereby reducing or eliminating the frictional drag between the surfaces 57, 58, 61 and 40a. Under these conditions, the coiled tension springs 47 separate the collar sections 45 and 46, so as to eliminate friction between surfaces 61 and 40a during rotation of the power head 15 with respect to the column 14. This is extremely important when a heavy rim-equipped tire A is mounted on the shaft 23 as it is swung to its broken line position of FIG. 1 for the purpose of mounting and dismounting such pneumatic tires, without interference with the leg 30 or any other underlying base-supported structure.

Mounted on and carried by slide member 3 is superstructure, identified in its entirety by 63, which defines a longitudinally extended secondary guideway 64. Superstructure 63 is pivotally secured to the slide member 3 adjacent the inner end of the guideway 64, as indicated at 65, for swinging movements of its outer end 66 about the vertical axis of the connection 65. A second slide member 67 is mounted for sliding movements in guideway 64 and such movements are imparted in opposite directions through the medium of a longitudinally extended screw 68 carried by and journalled to slide member 67 and having its intermediate portion screw threaded in a nut 69 carried by the superstructure 63. The driving connections and control mechanism for the screw 68 form no part of the instant invention and hence, will not be described.

Mounted on and carried by the second slide member 67 is a mounting standard 70 having a power-operated buffing head 71 on its upper end. The buffing head 71 is also of conventional design.

For the purpose of facilitating rotary swinging movements and stabilization of the guideway-defining superstructure 63 and the slide member 67 mounted therein during buffing operations, I provide a horizontally disposed segmental mounting bar 72 carried by the slide member 3 and having journalled thereon a plurality of circumferentially spaced roller elements 73, the upper surfaces of which support and have rolling contact with a segmental rail 74 fast on the guideway 64 in radially spaced concentric relation to the axis defined by the connection 65.

As seen, particularly in FIG. 4, the mounting plate 40 is formed to provide a segmental recess 75 for the reception of an upstanding lug 76 fast on and carried by the annular flange 60. The recess 75 defines a pair of circumferentially spaced radial shoulders 77 and 78 so positioned that shoulder 77 abuts the lug 76 to limit further rotary movement when the tire mounting power head 15 is moved to a position, indicated by broken lines in FIG. 1, whereby to mount to or dismount from the arbor 23, a rim equipped tire A. Preliminary to the mounting or dismounting of a tire A power head 15 is immobilized against rotary movement by means of a pin 79 inserted in aligned apertures 80 and 81, the former in the mounting plate 40 and the latter in the annular flange 60. When it is desired to move a tire A mounted on the arbor 23 into a position to be buffed or trued, the leg 30 is moved to its dotted line position of FIG. 3 and the pin 79 removed from the apertures 80–81. The power head 15 is then manually rotated in a counter-clockwise direction with respect to FIG. 1 to a position shown by full lines in FIG. 1, wherein the crown of a tire A is adjacent the buffing head 71. At this time the lug 76 is in abutting engagement with the shoulder 78 and limits further rotary movement. The pin 79 is then inserted into aperture 80 and a second aperture 82 in the annular flange 60 which is now aligned with the aperture 80. To assure correct alignment of a tire A with the buffing head 71 and support of the outer end of the arbor 23, the leg 30 is moved to the full line position of FIG. 3 with the male bearing 32, associated with the upper end of the leg 30, being received in the outwardly opening female bearing element 33. Further stabilization of the power head 15 and parts carried thereby is accomplished by tightening the nut 50 to cause frictional engagement of the surfaces 40a and 61 of the mounting plate 40 and flange 60 respectively, and the surfaces 57 and 58 of the spacer 59 and washer 56 respectively. It should be understood that the nut 50 must be in a loosened condition during all rotary movements of the power head 15 so as to permit such movement with a minimum of friction between the surfaces 40a, 61 and 57, 58.

With the above described arrangement, a maximum amount of accuracy is obtained in the buffing and truing of even the largest of tires with a minimum of effort in either the mounting or dismounting of such tires.

My invention has been thoroughly tested and found to be completely satisfactory for the accomplishment of the above objects, and while I have shown a preferred embodiment thereof, I wish it to be understood that same may be capable of modification without departure from the scope and spirit of the appended claims.

What is claimed is:

1. A tire buffing machine comprising in combination,
   (a) a base which defines a longitudinally disposed horizontal guideway,
   (b) a slide member mounted and guided in said guideway,
   (c) means for imparting limited longitudinal movements to said slide member in said guideway in opposite directions,
   (d) means defining superstructure carried by said slide member and defining a second horizontally disposed guideway,
   (e) means adjacent the inner end of said second-mentioned guideway pivotally securing said superstructure for swinging movements of the outer end thereof about a vertical axis,
   (f) a second slide member in said second guideway,
   (g) means for imparting longitudinal movements in opposite directions to said second-mentioned slide member in said second-mentioned guideway,
   (h) a mounting standard carried by said second-mentioned slide member and having a power-operated buffing head on its upper end which rotates about a horizontal axis, (i) a rigid column carried by said base in longitudinally spaced laterally offset relation to said first-mentioned guideway, (j) a tire-mounting power head carried by the upper end of said column and including a horizontally disposed laterally outwardly projecting shaft for rotation on a horizontal axis, (k) means journalling said tire-mounting power head for limited swinging movements of the projected end of the said shaft about a vertical axis, (l) and means releasably locking and supporting the projected end of said shaft in its operative position wherein the axis thereof is normal to the longitudinal axis of said first-mentioned guideway.

2. The structure defined in claim 1 in which said last-mentioned means comprises, (a) a leg carried by said base and pivotally secured thereto on a horizontal axis normal to the operative axis of said rotary shaft, (b) the upper end of said leg and the projected end of said shaft being formed to define cooperating male and female bearing elements, (c) and screw means for imparting pivotal swinging movements to said supporting leg towards and away from the extended end of said shaft.

3. The structure defined in claim 2 in further combination with means independent of said supporting leg for releasably locking said tire-mounting head in a desired position of movement about its said vertical axis.

4. The structure defined in claim 3 in which said column is formed in its upper end to define an upwardly opening socket, (a) said power head being mounted on a plate formed to define a depending neck snugly journalled in said socket, (b) yielding means normally raising said clamping plate and power head out of frictional contact with the upper end of said column whereby to reduce friction during swinging movements thereof, (c) means for positively clamping said plate and the power head carried thereby to said column against the bias of said yielding means.

References Cited in the file of this patent
UNITED STATES PATENTS

| | | |
|---|---|---|
| 1,949,999 | Frostad | Mar. 6, 1934 |
| 2,230,027 | Cobb et al. | Jan. 28, 1941 |
| 2,294,047 | Pollock | Aug. 25, 1942 |
| 2,392,667 | Hawkinson | Jan. 8, 1946 |
| 2,864,445 | Hawkinson | Dec. 16, 1958 |
| 2,945,534 | Hawkinson | July 19, 1960 |
| 2,965,162 | Hawkinson | Dec. 20, 1960 |
| 3,080,899 | Robertson | Mar. 12, 1963 |